United States Patent
Zhang et al.

(10) Patent No.: US 12,541,853 B2
(45) Date of Patent: Feb. 3, 2026

(54) AI BASED LESION SEGMENTATION AND DETECTION FOR MEDICAL IMAGES

(71) Applicant: Siemens Healthineers AG, Forchheim (DE)

(72) Inventors: Yanbo Zhang, Plainsboro, NJ (US); Sasa Grbic, Plainsboro, NJ (US); Dorin Comaniciu, Princeton, NJ (US)

(73) Assignee: Siemens Healthineers AG, Forchheim (DE)

( * ) Notice: Subject to any disclaimer, the term of this patent is extended or adjusted under 35 U.S.C. 154(b) by 369 days.

(21) Appl. No.: 18/189,263

(22) Filed: Mar. 24, 2023

(65) Prior Publication Data

US 2024/0320832 A1     Sep. 26, 2024

(51) Int. Cl.
*G06T 7/00* (2017.01)
*A61B 6/00* (2024.01)
(Continued)

(52) U.S. Cl.
CPC .......... *G06T 7/0016* (2013.01); *A61B 6/481* (2013.01); *A61B 6/502* (2013.01); *G06T 7/11* (2017.01);
(Continued)

(58) Field of Classification Search
CPC ....... A61B 6/481; A61B 6/502; G06T 7/0012; G06T 7/0016; G06T 7/11;
(Continued)

(56) References Cited

U.S. PATENT DOCUMENTS

| | | | |
|---|---|---|---|
| 2007/0211958 A1 * | 9/2007 | Khazen | G06T 7/0016 382/274 |
| 2009/0080741 A1 * | 3/2009 | Shinagawa | G06T 7/0012 600/410 |

(Continued)

FOREIGN PATENT DOCUMENTS

| | | | | |
|---|---|---|---|---|
| FR | 3124627 A1 * | 12/2022 | | G01R 33/5608 |
| WO | WO-2023275478 A1 * | 1/2023 | | G01R 33/5608 |

OTHER PUBLICATIONS

Gravina et al. "3TP-CNN: radiomics and deep learning for lesions classification in DCE-MRI." Image Analysis and Processing-ICIAP 2019: 20th International Conference, Trento, Italy, Sep. 9-13, 2019, Proceedings, Part II 20. Springer International Publishing, 2019. (Year: 2019).*

(Continued)

*Primary Examiner* — Katrina R Fujita (57) ABSTRACT

Systems and methods for performing a medical imaging analysis task are provided. A pre-contrast medical image and a plurality of post-contrast medical images of an anatomical object of a patient are received. A mask of the anatomical object is generated based on at least one of 1) the pre-contrast medical image or 2) one or more of the plurality of post-contrast medical images. One or more processed post-contrast medical images each associated with a respective feature are generated based on the plurality of post-contrast medical images and the mask of the anatomical object. A medical imaging analysis task is performed using a machine learning based network based on the one or more processed post-contrast medical images and the pre-contrast medical image masked with the mask of the anatomical object. Results of the medical imaging analysis task are output.

20 Claims, 6 Drawing Sheets

(51) Int. Cl.
*A61B 6/50* (2024.01)
*G06T 7/11* (2017.01)
(52) U.S. Cl.
CPC .............. *G06T 2207/10088* (2013.01); *G06T 2207/20081* (2013.01); *G06T 2207/20084* (2013.01); *G06T 2207/30068* (2013.01); *G06T 2207/30096* (2013.01)
(58) Field of Classification Search
CPC . G06T 2207/10088; G06T 2207/20081; G06T 2207/20084; G06T 2207/30068
See application file for complete search history.

(56) References Cited

U.S. PATENT DOCUMENTS

| | | | | |
|---|---|---|---|---|
| 2010/0142786 | A1* | 6/2010 | Degani | G06V 20/653 382/128 |
| 2023/0225630 | A1* | 7/2023 | Casagranda | A61B 5/055 382/128 |

OTHER PUBLICATIONS

Mann et al., "Breast MRI: state of the art", Radiology, 2019, pp. 520-536.
Adachi et al., "Detection and diagnosis of breast cancer using artificial intelligence based assessment of maximum intensity projection dynamic contrast-enhanced magnetic resonance images", Diagnostics, 2020, pp. 1-13.
Hecht et al., "Renal masses: Quantitative analysis of enhancement with signal intensity measurements versus qualitative analysis of enhancement with image subtraction for diagnosing malignancy at MR imaging", Radiology 2004, pp. 373-378.
Kuhl et al., "Abbreviated breast magnetic resonance imaging (MRI): first postcontrast subtracted images and maximum-intensity projection—a novel approach to breast cancer screening with MRI", Journal of Clinical Oncology, 2014, pp. 2304-2310.
Verburg et al., "Deep learning for automated triaging of 4581 breast MRI examinations from the DENSE trial", Radiology, 2022, pp. 29-36.
Jing et al., "Using deep learning to safely exclude lesions with only ultrafast breast MRI to shorten acquisition and reading time", European Radiology, 2022, 10 pgs.
Flanagan et al., "Digital subtraction in Gd-DTPA enhanced imaging of the breast", Clinical Radiology, 1995, pp. 848-854.
Min et al., "Automatic lesion detection, segmentation and characterization via 3D multiscale morphological sifting in breast MRI", Biomedical Physics & Engineering Express, 2020, 15 pgs.
Mango et al., "Abbreviated protocol for breast MRI: are multiple sequences needed for cancer detection?", European Journal of Radiology, 2014, pp. 1-31.
Witowski et al., "Improving breast cancer diagnostics with artificial intelligence for MRI", Science Translational Medicine, 2022, pp. 1-17.
Trajanovski et al., "Tongue tumor detection in hyperspectral images using deep learning semantic segmentation", IEEE Transactions on Biomedical Engineering, 2020, pp. 1-11.

* cited by examiner

AI BASED LESION SEGMENTATION AND DETECTION FOR MEDICAL IMAGES

TECHNICAL FIELD

The present invention relates generally to artificial intelligence/machine learning based medical imaging analysis, and in particular to artificial intelligence based lesion segmentation and detection for medical images.

BACKGROUND

Early diagnosis of breast cancer has shown to improve patient outcome. DCE-MRI (dynamic contrast-enhanced magnetic resonance imaging) is widely used in the current clinical practice as DCE-MRI has the highest sensitivity for breast cancer detection among current clinical imaging modalities. To perform DCE-MRI imaging of the breast of a patient, a pre-contrast T-1 weighted image is first acquired, a contrast material is then administered, and finally a plurality of post-contrast T-1 weighted images is acquired. The number of post-contrast T-1 weighted images typically varies between 2 to 6 acquisitions.

Conventionally, breast lesion segmentation and detection in DCE-MRI imaging are performed based on a subtraction between one of the post-contrast T-1 weighted images and the pre-contrast T-1 weighted image. However, in such conventional breast lesion segmentation and detection approaches, the contrast enhanced diffusion features along the acquisition time band are not considered.

BRIEF SUMMARY OF THE INVENTION

In accordance with one or more embodiments, systems and methods for performing a medical imaging analysis task are provided. A pre-contrast medical image and a plurality of post-contrast medical images of an anatomical object of a patient are received. A mask of the anatomical object is generated based on at least one of 1) the pre-contrast medical image or 2) one or more of the plurality of post-contrast medical images. One or more processed post-contrast medical images each associated with a respective feature are generated based on the plurality of post-contrast medical images and the mask of the anatomical object. A medical imaging analysis task is performed using a machine learning based network based on the one or more processed post-contrast medical images and the pre-contrast medical image masked with the mask of the anatomical object. Results of the medical imaging analysis task are output.

In one embodiment, a dimension reduction operation is performed for extracting the one or more processed post-contrast medical images from the plurality of post-contrast medical images. One or more principal eigenvectors are identified based on a vectorized representation of the plurality of post-contrast medical images masked by the mask of the anatomical object. Each of the one or more processed post-contrast medical images is generated based on a respective one of the one or more principal eigenvectors.

In one embodiment, the features represent key components extracted from the plurality of post-contrast medical images masked by the mask of the anatomical object.

In one embodiment, the pre-contrast medical image and the plurality of post-contrast medical images are fat-saturated T1 weighted magnetic resonance imaging images of the patient.

In one embodiment, the machine learning based network receives as input 1) the pre-contrast medical image masked with the mask of the anatomical object and 2) the one or more processed post-contrast medical images and generates as output the results of the medical imaging analysis task.

In one embodiment, the medical imaging analysis task comprises at least one of segmentation or detection of a lesion. The anatomical object may comprise a breast of the patient.

These and other advantages of the invention will be apparent to those of ordinary skill in the art by reference to the following detailed description and the accompanying drawings.

DETAILED DESCRIPTION

The present invention generally relates to methods and systems for artificial intelligence/machine learning based lesion segmentation and detection for medical images. Embodiments of the present invention are described herein to give a visual understanding of such methods and systems. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments described herein provide for systems and methods for deep learning based lesion segmentation and detection in breast MRI imaging that utilize features extracted from a pre-contrast image acquisition and a plurality of post-contrast image acquisitions. The lesion segmentation and detection apply a dimension reduction operation, such as, e.g., PCA (principal component analysis), to the plurality of post-contrast image acquisitions masked by a mask of the breast for fully exploring features of the plurality of post-contrast image acquisitions along all time bands, enabling the extraction and analysis of key contrast enhanced diffusion features from the plurality of post-contrast image acquisitions while excluding irrelevant regions. Advantageously, embodiments described herein provide for lesion segmentation and detection that is more robust and flexible to different image acquisition settings.

Figure 1:
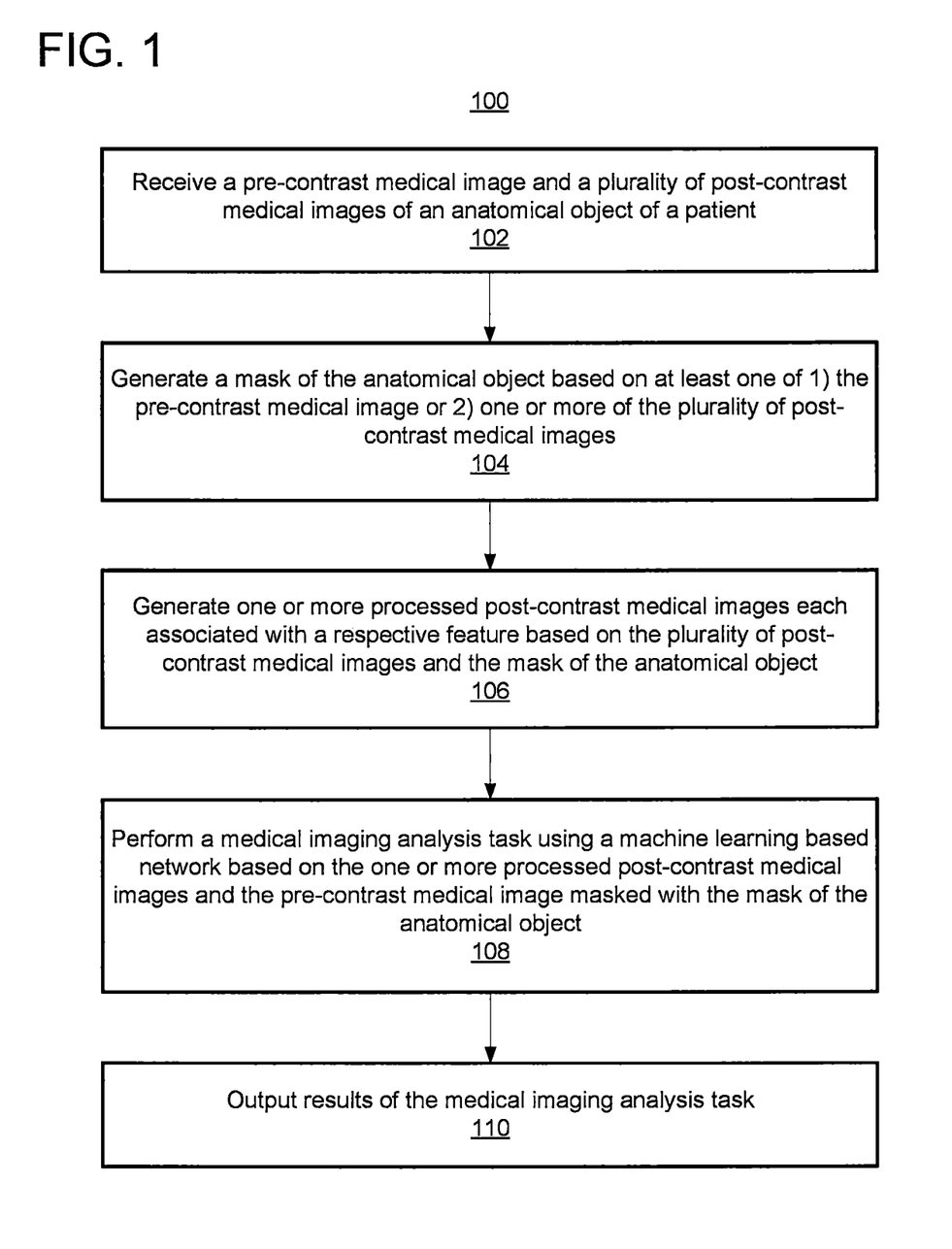
FIG. 1 shows a method for performing a medical imaging analysis task, in accordance with one or more embodiments.
Figure 2:
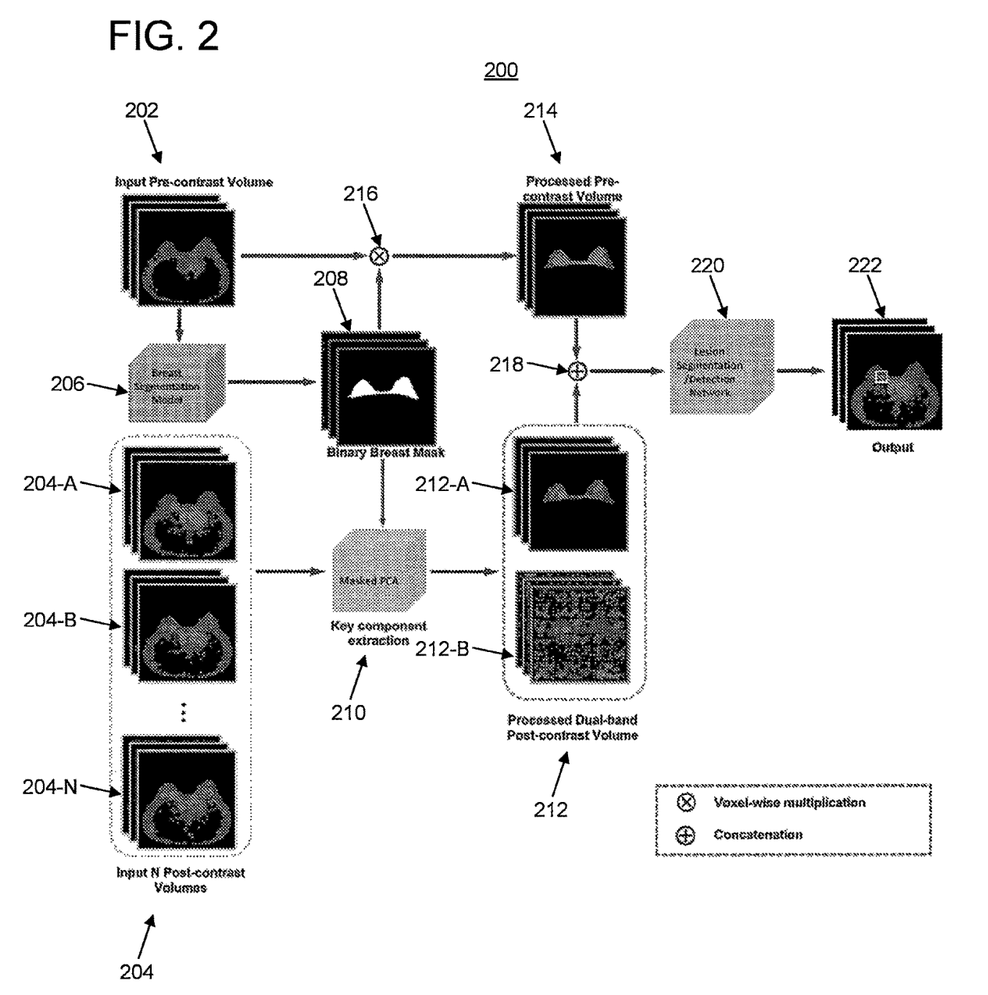
FIG. 2 shows a workflow for performing a medical imaging analysis task, in accordance with one or more embodiments.

FIG. 1 shows a method 100 for performing a medical imaging analysis task, in accordance with one or more embodiments. The steps of method 100 may be performed by one or more suitable computing devices, such as, e.g., computer 502 of FIG. 5. FIG. 2 shows a workflow 200 for performing a medical imaging analysis task, in accordance with one or more embodiments. FIG. 1 and FIG. 2 will be described together.

At step 102, a pre-contrast medical image and a plurality of post-contrast medical images of an anatomical object of a patient are received. In one example, as shown in workflow 200 of FIG. 2, the pre-contrast medical image is input pre-contrast volume 202 and the plurality of post-contrast medical images is input N post-contrast volume 204 comprising post-contrast volumes 204-A, 204-B, . . . , 204-N, where N is any integer greater than 1.

The pre-contrast medical image is acquired prior to administration of a contrast agent (or contrast medium) to the patient while the plurality of post-contrast medical images is acquired after administration of the contrast agent to the patient. Thus, the pre-contrast medical image is not contrast enhanced by the contrast agent while the plurality of post-contrast medical images is contrast enhanced by the contrast agent. The contrast agent may be any suitable contrast agent for increasing the contrast to the anatomical object or other structures or fluids within the patient. For example, the contrast agent may be gadolinium, iodine, barium, etc. In one embodiment, the anatomical object depicted in the pre-contrast medical image and the plurality of post-contrast medical images is a breast of the patient. However, the anatomical object may be any other suitable anatomical object of interest, such as, e.g., an organ, a bone, a vessel, a lesion, etc.

The pre-contrast medical image and the plurality of post-contrast medical images may be of any suitable modality, such as, e.g., MRI (magnetic resonance imaging), CT (computed tomography), ultrasound, x-ray, or any other medical imaging modality or combinations of medical imaging modalities. In one embodiment, the images are DCE-MRI (dynamic contrast-enhanced MRI) images, where the pre-contrast medical image is a fat-saturated T1-weighted image acquired prior to the administration of the contrast agent and the plurality of post-contrast medical images are fat-saturated T1-weighted images acquired after the administration of the contrast agent. In one embodiment, the plurality of post-contrast medical images commonly comprises two to six post-contrast medical images. However, the plurality of post-contrast medical images may comprise any number of images greater than one.

The pre-contrast medical image and the plurality of post-contrast medical images may be 2D (two dimensional) images and/or 3D (three dimensional) volumes. Accordingly, reference herein to pixels of a 2D image equally apply to voxels of a 3D volume and vice versa. In one example, as shown in workflow 200 of FIG. 2, input pre-contrast volume 202 and input N post-contrast volume 204 are 3D volumes represented as 2D cross-sectional slices. The pre-contrast medical image and the plurality of post-contrast medical images may be received directly from an image acquisition device, such as, e.g., an MRI scanner, as the medical images are acquired, or can be received by loading previously acquired medical images from a storage or memory of a computer system or receiving medical images that have been transmitted from a remote computer system.

At step 104 of FIG. 1, a mask of the anatomical object is generated based on at least one of 1) the pre-contrast medical image or 2) one or more of the plurality of post-contrast medical images. The mask of the anatomical object may be generated by segmenting the anatomical object from the one or more of 1) the pre-contrast medical image or 2) one or more of the plurality of post-contrast medical images. For example, the anatomical object may be segmented from the one or more of 1) the pre-contrast medical image or 2) one or more of the plurality of post-contrast medical images using a machine learning based segmentation model, such as, e.g., a 3D U-Net or any other suitable machine learning based segmentation model. However, the segmentation may be performed according to any known approach.

In one embodiment, the mask may be a probability map where each respective pixel (or voxel) has an intensity value ranging from, e.g., 0 to 1 indicating a probability that the respective pixel depicts the anatomical object. In another embodiment, the mask may be a binary map generated by, for example, applying a threshold (e.g., 0.5) to the probability map, where each respective pixel of the binary map has an intensity value of 1 indicating that the respective pixel depicts the anatomical object or 0 indicating that the respective pixel does not depict the anatomical object. The mask may be in any other suitable form.

In one example, as shown in workflow 200 of FIG. 2, the breast is segmented from input pre-contrast volume 202 using machine learning based breast segmentation model 206 to generate a 3D binary breast mask 208. 3D binary breast mask 208 is used to focus the downstream processing of input pre-contrast volume 202 and input N post-contrast volume 204 (e.g., at step 108 of FIG. 1) to ensure the downstream processing focuses only on the high-contrast signals of the anatomical object, thereby reducing false positives in the regions outside the anatomical object (e.g., non-breast regions).

At step 106 of FIG. 1, one or more processed post-contrast medical images each associated with a respective feature are generated based on the plurality of post-contrast medical images and the mask of the anatomical object. In one embodiment, the one or more processed post-contrast medical images are generated by applying a dimension reduction operation to extract key components or features from the plurality of post-contrast medical images masked by the mask of the anatomical object to identify one or more principal eigenvectors and each of the one or more processed post-contrast medical images is generated from a respective principal eigenvector. By performing key component extraction, the contrast information along all time bands represented in the plurality of post-contrast medical images are fully explored and utilized.

In one example, as shown in workflow 200 of FIG. 2, key component extraction 210 is applied on input N post-contrast volumes 204 masked by binary breast mask 208 to generate processed dual-band post-contrast volume 212 comprising processed 3D post-contrast volumes 212-A and 212-B. Key component extraction 210 represents a dimension reduction operation for extracting processed dual-band post-contrast volume 212 from input N post-contrast volumes 204. While two processed post-contrast volumes are shown in workflow 200, processed dual-band post-contrast volume 212 may comprise any number of processed post-contrast volumes equal to or greater than one. The implementation of key component extraction 210 can be masked PCA (principal component analysis), RPCA (robust PCA), ICA (independent component analysis), tensor-decomposition, or any other suitable dimension reduction operation. PCA identifies and extracts the most significant and informative orthogonal features of the original data. In contrast, ICA transforms a set of input data into a maximally independent set. ICA can be used to separate mixed signal sources, as in the "cocktail party problem". Tensor decomposition is similar to PCA, but it is performed on high-order data.

The features may comprise any suitable feature extracted from the plurality of post-contrast volumes. For example, as shown in workflow 200 of FIG. 2, when masked PCA is utilized as the key component extractor 210, post-contrast volume 212-A is the feature of the average of all of the input N post-contrast volumes 212 as masked by binary breast mask 208, and post-contrast volume 212-B represents the feature of the identification of the primary contribution of the contrast enhanced material. However, the features may be any other suitable features extracted from the plurality of post-contrast volumes. In general, each post-contrast volume 212 can be assumed as the superimposition of background tissues and contrast material at different concentrations.

Let $v^n \in \mathbb{R}^M$, n=1, ..., N be a column vector of the $n^{th}$ vectorized post-contrast medical image, where M is the number of voxels in the $n^{th}$ vectorized post-contrast medical image and N is the number of total images in the input N post-contrast volumes 204. Further, let $m \in \mathbb{R}^M$ be a vector of the vectorized mask of the anatomical object, where the foreground and background values are, e.g., 1 and 0 respectively. Thus, the total input N post-contrast volumes 204 can be represented as a matrix $V=[v^1, ..., v^N] \in \mathbb{R}^{M \times N}$, and input N post-contrast volumes 204 masked by binary breast mask 208 can be denoted as $V^*=[v^1{}^*m, ..., v^N{}^*m] \in \mathbb{R}^{M \times N}$. PCA is applied to the masked volumes $V^*$, and the top K principal eigenvectors $e^k \in \mathbb{R}^M$, k=1, ..., K (K≤N) are selected. Then, each principal eigen vector is reshaped to generate processed 3D post-contrast volume 212-A and 212-B. In the example shown in FIG. 2, K is uniformly set to 2 such that two time bands of volumes are generated.

At step 108 of FIG. 1, a medical imaging analysis task is performed using a machine learning based network based on the one or more processed post-contrast medical images and the pre-contrast medical image masked with the mask of the anatomical object. In one example, the medical imaging analysis task is the segmentation or detection of lesions. However, the medical imaging analysis task may be any other suitable medical imaging analysis task.

In one example, as shown in workflow 200 of FIG. 2, lesion segmentation or detection is performed by lesion segmentation/detection network 220. In the example shown in FIG. 2, lesion segmentation/detection network 220 receives as input processed pre-contrast volume 214 and processed dual-band post-contrast volume 212 in the form of a, e.g., three channel image. The first channel may be processed pre-contrast volume 214 representing input pre-contrast volume 202 masked by binary breast mask 208 generated by applying voxel-wise multiplication 216. The second and third channels may be post-contrast volume 212-A and post-contrast volume 212-B respectively. Processed pre-contrast volume 214, post-contrast volume 212-A, and post-contrast volume 212-B are combined, e.g., by concatenation 218, and input into lesion segmentation/detection network 220 as the three channel image. Lesion segmentation/detection network 220 generates output 220 as output. For example, where the medical imaging analysis task is lesion segmentation, output 222 may be a segmentation mask of the lesion. In another example, where the medical imaging analysis task is lesion detection, output 222 may be a 3D bounding box around the lesion.

In one embodiment, the machine learning based network is implemented using a CNN (convolutional neural network) or a transformer network. However, the machine learning based network may be implemented according to any other suitable machine learning based architecture, such as, e.g., a U-Net or a Dense U-Net. The machine learning based network is trained during a prior offline or training phase. Once trained, the machine learning based network is applied during an online or inference stage, e.g., to perform step 108 of FIG. 1.

At step 110 of FIG. 1, results of the medical imaging analysis task are output. In one example, as shown in workflow 200 of FIG. 2, the results may comprise a segmentation mask of a lesion where the medical imaging analysis task is lesion segmentation or the results may comprise a 3D bounding box around a lesion where the medical imaging analysis task is lesion detection. The results of the medical imaging analysis task can be output by, for example, displaying the results of the medical imaging analysis task on a display device of a computer system, storing the results of the medical imaging analysis task on a memory or storage of a computer system, or transmitting the results of the medical imaging analysis task to a remote computer system.

Advantageously, embodiments described herein provide for the utilization of features extracted from all of the plurality of post-contrast medical images, results in more accurate results of the medical imaging analysis task while being robust and flexible to different image acquisition settings.

Embodiments described herein are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the providing system.

Furthermore, certain embodiments described herein are described with respect to methods and systems utilizing trained machine learning based networks (or models), as well as with respect to methods and systems for training machine learning based networks. Features, advantages or alternative embodiments herein can be assigned to the other claimed objects and vice versa. In other words, claims for methods and systems for training a machine learning based network can be improved with features described or claimed in context of the methods and systems for utilizing a trained machine learning based network, and vice versa.

In particular, the trained machine learning based networks applied in embodiments described herein can be adapted by the methods and systems for training the machine learning based networks. Furthermore, the input data of the trained machine learning based network can comprise advantageous features and embodiments of the training input data, and vice versa. Furthermore, the output data of the trained machine learning based network can comprise advantageous features and embodiments of the output training data, and vice versa.

In general, a trained machine learning based network mimics cognitive functions that humans associate with other human minds. In particular, by training based on training data, the trained machine learning based network is able to adapt to new circumstances and to detect and extrapolate patterns.

In general, parameters of a machine learning based network can be adapted by means of training. In particular, supervised training, semi-supervised training, unsupervised training, reinforcement learning and/or active learning can be used. Furthermore, representation learning (an alternative term is "feature learning") can be used. In particular, the parameters of the trained machine learning based network can be adapted iteratively by several steps of training.

In particular, a trained machine learning based network can comprise a neural network, a support vector machine, a decision tree, and/or a Bayesian network, and/or the trained machine learning based network can be based on k-means clustering, Q-learning, genetic algorithms, and/or association rules. In particular, a neural network can be a deep neural network, a convolutional neural network, or a convolutional deep neural network. Furthermore, a neural network can be an adversarial network, a deep adversarial network and/or a generative adversarial network.

Figure 3:
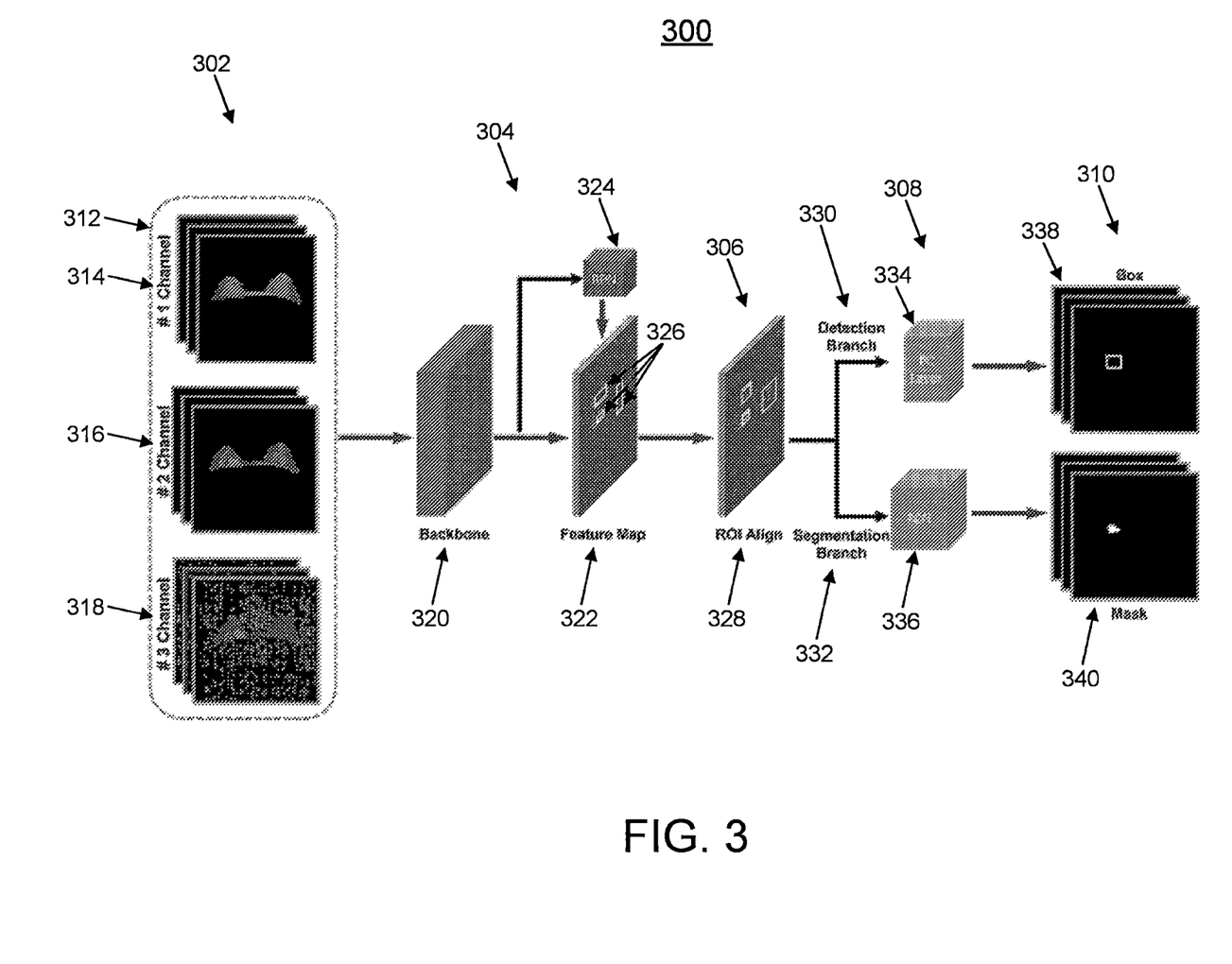
FIG. 3 shows an exemplary mask R-CNN (region-based convolutional neural network) that may be used to implement one or more embodiments.

FIG. 3 shows a Mask R-CNN (region-based convolutional neural network) 300, in accordance with one or more embodiments. Machine learning networks described herein, such as, e.g., the machine learning based network utilized at steps 104 and 108 of FIG. 1 and breast segmentation model 206 and lesion segmentation/detection network 220 of FIG. 2, may be implemented using Mask R-CNN 300.

In the embodiment shown in FIG. 3, Mask R-CNN 300 comprises an input layer 302, a convolutional layer 304, a pooling layer 306, a fully connected layer 308, and an output layer 310. Alternatively, the convolutional neural network 300 can comprise several convolutional layers 304, several pooling layers 306, and several fully connected layers 308, as well as other types of layers. The order of the layers can be chosen arbitrarily, usually fully connected layers 308 are used as the last layers before the output layer 310.

In one embodiment, for the medical imaging analysis task of, e.g., lesion segmentation/detection, input layer 302 of the Mask R-CNN 300 receives a multi-channel 3D volume 312 comprising channels 314, 316, and 318. In the example shown in workflow 200 of FIG. 2, channel 314 comprises processed pre-contrast volume 214, channel 316 comprises post-contrast volume 212-A, and channel 318 comprises post-contrast volume 212-B. In another embodiment, for the medical imaging analysis task of, e.g., breast segmentation, input layer 302 of Mask R-CNN 300 receives input pre-contrast volume 202 of FIG. 2.

In the embodiment shown in FIG. 3, backbone 320 of convolutional layer 304 is used to extract feature map 322 from the input multi-channel 3D volume 312. The implementation backbone 320 can be, for example, ResNet (residual neural network), FPN (Feature Pyramid Network), etc.

In the embodiment shown in FIG. 3, convolutional layer 304 comprises an RPN (Region Proposal Network) 324 for proposing candidate object bounding boxes 326 in feature map 322.

In the embodiment shown in FIG. 3, pooling layer 306 comprises an RoI Align (region of interest align) operation 328 for extracting a small feature map from each region of interest defined by the candidate bounding boxes 326. An aligned region of interest has 3*3*3 bins, and the RoI operation 328 involves the use of bilinear interpolation to compute the exact values of the input features at four regularly sampled locations in each region of interest bin, which are then aggregated using either max or average pooling. As a result, aligned features with a size of 3*3*3 are obtained for each region of interest.

The Mask R-CNN 300 in the embodiment shown in FIG. 3 includes both a detection branch 330 and a segmentation branch 332, which generate boxes and masks, respectively. Depending on the requirements of the medical imaging analysis task, Mask R-CNN 300 can include either one or both of the branches 330, 332. In detection branch 330, a fully connected (FC) layer 334 is utilized to classify candidate boxes 326 as true or false, ultimately generating the final boxes 338 output in output layer 310. In segmentation branch 332, a Fully Convolutional Network (FCN) 336 is applied to generate voxel-wise masks 340 in output layer 310.

Figure 4:
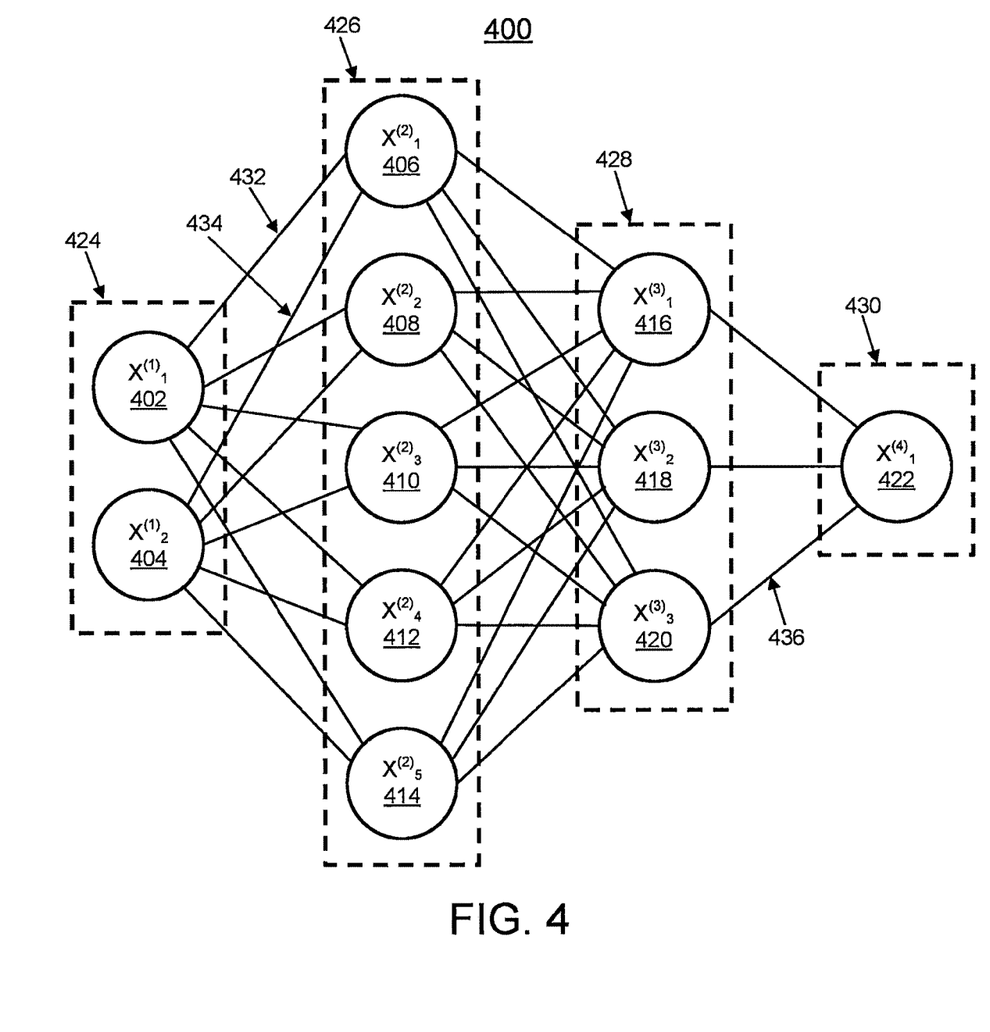
FIG. 4 shows an exemplary artificial neural network that may be used to implement one or more embodiments.

FIG. 4 shows an embodiment of an artificial neural network 400, in accordance with one or more embodiments. Alternative terms for "artificial neural network" are "neural network", "artificial neural net" or "neural net". Machine learning networks described herein, such as, e.g., the machine learning based network utilized at steps 104 and 108 of FIG. 1 and breast segmentation model 206 and lesion segmentation/detection network 220 of FIG. 2, may be implemented using artificial neural network 400.

The artificial neural network 400 comprises nodes 402-422 and edges 432, 434, . . . , 436, wherein each edge 432, 434, . . . , 436 is a directed connection from a first node 402-422 to a second node 402-422. In general, the first node 402-422 and the second node 402-422 are different nodes 402-422, it is also possible that the first node 402-422 and the second node 402-422 are identical. For example, in FIG. 4, the edge 432 is a directed connection from the node 402 to the node 406, and the edge 434 is a directed connection from the node 404 to the node 406. An edge 432, 434, . . . , 436 from a first node 402-422 to a second node 402-422 is also denoted as "ingoing edge" for the second node 402-422 and as "outgoing edge" for the first node 402-422.

In this embodiment, the nodes 402-422 of the artificial neural network 400 can be arranged in layers 424-430, wherein the layers can comprise an intrinsic order introduced by the edges 432, 434, . . . , 436 between the nodes 402-422. In particular, edges 432, 434, . . . , 436 can exist only between neighboring layers of nodes. In the embodiment shown in FIG. 4, there is an input layer 424 comprising only nodes 402 and 404 without an incoming edge, an output layer 430 comprising only node 422 without outgoing edges, and hidden layers 426, 428 in-between the input layer 424 and the output layer 430. In general, the number of hidden layers 426, 428 can be chosen arbitrarily. The number of nodes 402 and 404 within the input layer 424 usually relates to the number of input values of the neural network 400, and the number of nodes 422 within the output layer 430 usually relates to the number of output values of the neural network 400.

In particular, a (real) number can be assigned as a value to every node 402-422 of the neural network 400. Here, $x^{(n)}_i$ denotes the value of the i-th node 402-422 of the n-th layer 424-430. The values of the nodes 402-422 of the input layer 424 are equivalent to the input values of the neural network 400, the value of the node 422 of the output layer 430 is equivalent to the output value of the neural network 400. Furthermore, each edge 432, 434, . . . , 436 can comprise a weight being a real number, in particular, the weight is a real number within the interval [−1, 1] or within the interval [0, 1]. Here, $w^{(m,n)}_{i,j}$ denotes the weight of the edge between the i-th node 402-422 of the m-th layer 424-430 and the j-th node 402-422 of the n-th layer 424-430. Furthermore, the abbreviation $w^{(n)}_{i,j}$ is defined for the weight $w^{(n,n+1)}_{i,j}$.

In particular, to calculate the output values of the neural network 400, the input values are propagated through the neural network. In particular, the values of the nodes 402-422 of the (n+1)-th layer 424-430 can be calculated based on the values of the nodes 402-422 of the n-th layer 424-430 by $$x_j^{(n+1)} = f\left(\sum_i x_i^{(n)} \cdot w_{i,j}^{(n)}\right).$$

Herein, the function f is a transfer function (another term is "activation function"). Known transfer functions are step functions, sigmoid function (e.g. the logistic function, the generalized logistic function, the hyperbolic tangent, the Arctangent function, the error function, the smoothstep function) or rectifier functions. The transfer function is mainly used for normalization purposes.

In particular, the values are propagated layer-wise through the neural network, wherein values of the input layer 424 are given by the input of the neural network 400, wherein values of the first hidden layer 426 can be calculated based on the values of the input layer 424 of the neural network, wherein values of the second hidden layer 428 can be calculated based in the values of the first hidden layer 426, etc.

In order to set the values $w^{(m,n)}_{i,j}$ for the edges, the neural network 400 has to be trained using training data. In particular, training data comprises training input data and training output data (denoted as $t_i$). For a training step, the neural network 400 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 400 (backpropagation algorithm). In particular, the weights are changed according to $$w'^{(n)}_{i,j} = w^{(n)}_{i,j} - \gamma \cdot \delta^{(n)}_j \cdot x^{(n)}_i$$

wherein $\gamma$ is a learning rate, and the numbers $\delta^{(n)}_j$ can be recursively calculated as $$\delta^{(n)}_j = \left(\sum_k \delta^{(n+1)}_k \cdot w^{(n+1)}_{j,k}\right) \cdot f'\left(\sum_i x^{(n)}_i \cdot w^{(n)}_{i,j}\right)$$

based on $\delta^{(n+1)}_j$, if the (n+1)-th layer is not the output layer, and $$\delta^{(n)}_j = \left(x^{(n+1)}_k - t^{(n+1)}_j\right) \cdot f'\left(\sum_i x^{(n)}_i \cdot w^{(n)}_{i,j}\right)$$

if the (n+1)-th layer is the output layer 430, wherein f' is the first derivative of the activation function, and $y^{(n+1)}_j$ is the comparison training value for the j-th node of the output layer 430.

Figure 5:
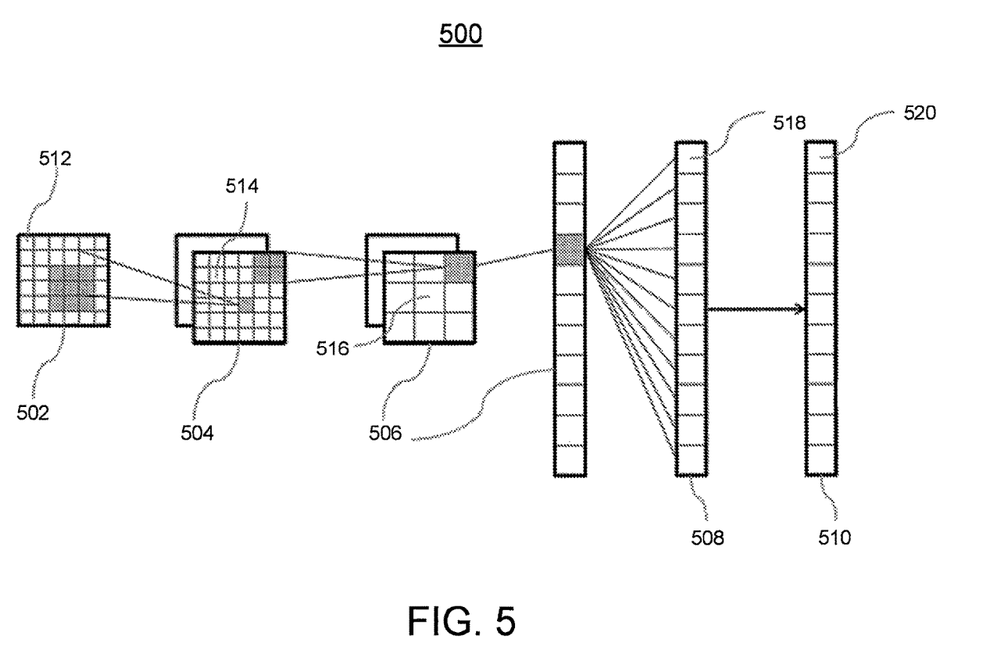
FIG. 5 shows a convolutional neural network that may be used to implement one or more embodiments.

FIG. 5 shows a convolutional neural network 500, in accordance with one or more embodiments. Machine learning networks described herein, such as, e.g., the machine learning based network utilized at steps 104 and 108 of FIG. 1 and breast segmentation model 206 and lesion segmentation/detection network 220 of FIG. 2, may be implemented using convolutional neural network 500.

In the embodiment shown in FIG. 5, the convolutional neural network comprises 500 an input layer 502, a convolutional layer 504, a pooling layer 506, a fully connected layer 508, and an output layer 510. Alternatively, the convolutional neural network 500 can comprise several convolutional layers 504, several pooling layers 506, and several fully connected layers 508, as well as other types of layers.

The order of the layers can be chosen arbitrarily, usually fully connected layers 508 are used as the last layers before the output layer 510.

In particular, within a convolutional neural network 500, the nodes 512-520 of one layer 502-510 can be considered to be arranged as a d-dimensional matrix or as a d-dimensional image. In particular, in the two-dimensional case the value of the node 512-520 indexed with i and j in the n-th layer 502-510 can be denoted as $x^{(n)}_{[i,j]}$. However, the arrangement of the nodes 512-520 of one layer 502-510 does not have an effect on the calculations executed within the convolutional neural network 500 as such, since these are given solely by the structure and the weights of the edges.

In particular, a convolutional layer 504 is characterized by the structure and the weights of the incoming edges forming a convolution operation based on a certain number of kernels. In particular, the structure and the weights of the incoming edges are chosen such that the values $x^{(n)}_k$ of the nodes 514 of the convolutional layer 504 are calculated as a convolution $x^{(n)}_k = K_k * x^{(n-1)}$ based on the values $x^{(n-1)}$ of the nodes 512 of the preceding layer 502, where the convolution * is defined in the two-dimensional case as $$x^{(n)}_k[i,j] = (K_k * x^{(n-1)})[i,j] = \sum_{i'}\sum_{j'} K_k[i',j'] \cdot x^{(n-1)}[i-i', j-j'].$$

Here the k-th kernel $K_k$ is a d-dimensional matrix (in this embodiment a two-dimensional matrix), which is usually small compared to the number of nodes 512-518 (e.g. a 3×3 matrix, or a 5×5 matrix). In particular, this implies that the weights of the incoming edges are not independent, but chosen such that they produce said convolution equation. In particular, for a kernel being a 3×3 matrix, there are only 9 independent weights (each entry of the kernel matrix corresponding to one independent weight), irrespectively of the number of nodes 512-520 in the respective layer 502-510. In particular, for a convolutional layer 504, the number of nodes 514 in the convolutional layer is equivalent to the number of nodes 512 in the preceding layer 502 multiplied with the number of kernels.

If the nodes 512 of the preceding layer 502 are arranged as a d-dimensional matrix, using a plurality of kernels can be interpreted as adding a further dimension (denoted as "depth" dimension), so that the nodes 514 of the convolutional layer 504 are arranged as a (d+1)-dimensional matrix. If the nodes 512 of the preceding layer 502 are already arranged as a (d+1)-dimensional matrix comprising a depth dimension, using a plurality of kernels can be interpreted as expanding along the depth dimension, so that the nodes 514 of the convolutional layer 504 are arranged also as a (d+1)-dimensional matrix, wherein the size of the (d+1)-dimensional matrix with respect to the depth dimension is by a factor of the number of kernels larger than in the preceding layer 502.

The advantage of using convolutional layers 504 is that spatially local correlation of the input data can exploited by enforcing a local connectivity pattern between nodes of adjacent layers, in particular by each node being connected to only a small region of the nodes of the preceding layer.

In embodiment shown in FIG. 5, the input layer 502 comprises 36 nodes 512, arranged as a two-dimensional 6×6 matrix. The convolutional layer 504 comprises 72 nodes 514, arranged as two two-dimensional 6×6 matrices, each of the two matrices being the result of a convolution of the values of the input layer with a kernel. Equivalently, the nodes 514 of the convolutional layer 504 can be interpreted as arranges as a three-dimensional 6×6×2 matrix, wherein the last dimension is the depth dimension.

A pooling layer 506 can be characterized by the structure and the weights of the incoming edges and the activation function of its nodes 516 forming a pooling operation based on a non-linear pooling function f. For example, in the two dimensional case the values $x^{(n)}$ of the nodes 516 of the pooling layer 506 can be calculated based on the values $x^{(n-1)}$ of the nodes 514 of the preceding layer 504 as $$x^{(n)}[i, j] = f(x^{(n-1)}[id_1, jd_2], \ldots, x^{(n-1)}[id_1 + d_1 - 1, jd_2 + d_2 - 1])$$

In other words, by using a pooling layer 506, the number of nodes 514, 516 can be reduced, by replacing a number d1·d2 of neighboring nodes 514 in the preceding layer 504 with a single node 516 being calculated as a function of the values of said number of neighboring nodes in the pooling layer. In particular, the pooling function f can be the max-function, the average or the L2-Norm. In particular, for a pooling layer 506 the weights of the incoming edges are fixed and are not modified by training.

The advantage of using a pooling layer 506 is that the number of nodes 514, 516 and the number of parameters is reduced. This leads to the amount of computation in the network being reduced and to a control of overfitting.

In the embodiment shown in FIG. 5, the pooling layer 506 is a max-pooling, replacing four neighboring nodes with only one node, the value being the maximum of the values of the four neighboring nodes. The max-pooling is applied to each d-dimensional matrix of the previous layer; in this embodiment, the max-pooling is applied to each of the two two-dimensional matrices, reducing the number of nodes from 72 to 18.

A fully-connected layer 508 can be characterized by the fact that a majority, in particular, all edges between nodes 516 of the previous layer 506 and the nodes 518 of the fully-connected layer 508 are present, and wherein the weight of each of the edges can be adjusted individually.

In this embodiment, the nodes 516 of the preceding layer 506 of the fully-connected layer 508 are displayed both as two-dimensional matrices, and additionally as non-related nodes (indicated as a line of nodes, wherein the number of nodes was reduced for a better presentability). In this embodiment, the number of nodes 518 in the fully connected layer 508 is equal to the number of nodes 516 in the preceding layer 506. Alternatively, the number of nodes 516, 518 can differ.

Furthermore, in this embodiment, the values of the nodes 520 of the output layer 510 are determined by applying the Softmax function onto the values of the nodes 518 of the preceding layer 508. By applying the Softmax function, the sum the values of all nodes 520 of the output layer 510 is 1, and all values of all nodes 520 of the output layer are real numbers between 0 and 1.

A convolutional neural network 500 can also comprise a ReLU (rectified linear units) layer or activation layers with non-linear transfer functions. In particular, the number of nodes and the structure of the nodes contained in a ReLU layer is equivalent to the number of nodes and the structure of the nodes contained in the preceding layer. In particular, the value of each node in the ReLU layer is calculated by applying a rectifying function to the value of the corresponding node of the preceding layer.

The input and output of different convolutional neural network blocks can be wired using summation (residual/dense neural networks), element-wise multiplication (attention) or other differentiable operators. Therefore, the convolutional neural network architecture can be nested rather than being sequential if the whole pipeline is differentiable.

In particular, convolutional neural networks 500 can be trained based on the backpropagation algorithm. For preventing overfitting, methods of regularization can be used, e.g. dropout of nodes 512-520, stochastic pooling, use of artificial data, weight decay based on the L1 or the L2 norm, or max norm constraints. Different loss functions can be combined for training the same neural network to reflect the joint training objectives. A subset of the neural network parameters can be excluded from optimization to retain the weights pretrained on another datasets.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIG. 1 or 2. Certain steps or functions of the methods and workflows described herein, including one or more of the steps or functions of FIG. 1 or 2, may be performed by a server or by another processor in a network-based cloud-computing system. Certain steps or functions of the methods and workflows described herein, including one or more of the steps or functions of FIG. 1 or 2, may be performed by a client computer in a network-based cloud computing system. The steps or functions of the methods and workflows described herein, including one or more of the steps or functions of FIG. 1 or 2, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIG. 1 or 2, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
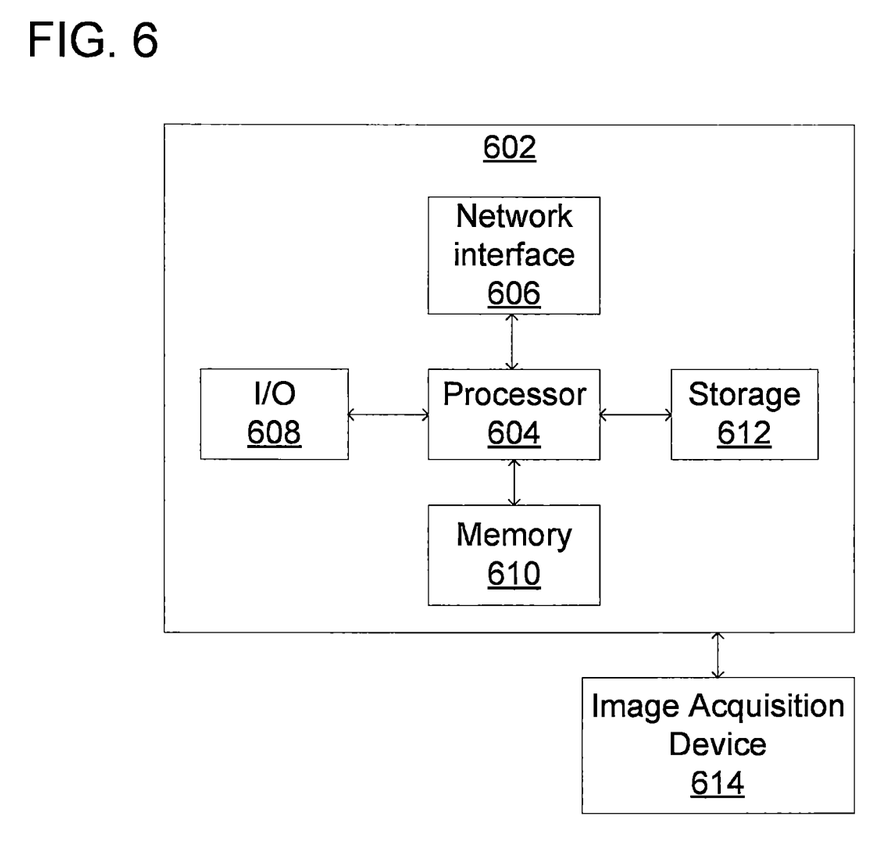
FIG. 6 shows a high-level block diagram of a computer that may be used to implement one or more embodiments.

A high-level block diagram of an example computer 602 that may be used to implement systems, apparatus, and methods described herein is depicted in FIG. 6. Computer 602 includes a processor 604 operatively coupled to a data storage device 612 and a memory 610. Processor 604 controls the overall operation of computer 602 by executing computer program instructions that define such operations. The computer program instructions may be stored in data storage device 612, or other computer readable medium, and loaded into memory 610 when execution of the computer program instructions is desired. Thus, the method and workflow steps or functions of FIG. 1 or 2 can be defined by the computer program instructions stored in memory 610 and/or data storage device 612 and controlled by processor 604 executing the computer program instructions. For example, the computer program instructions can be implemented as computer executable code programmed by one skilled in the art to perform the method and workflow steps or functions of FIG. 1 or 2. Accordingly, by executing the computer program instructions, the processor 604 executes the method and workflow steps or functions of FIG. 1 or 2. Computer 602 may also include one or more network interfaces 606 for communicating with other devices via a network. Computer 602 may also include one or more input/output devices 608 that enable user interaction with computer 602 (e.g., display, keyboard, mouse, speakers, buttons, etc.).

Processor 604 may include both general and special purpose microprocessors, and may be the sole processor or one of multiple processors of computer 602. Processor 604 may include one or more central processing units (CPUs), for example. Processor 604, data storage device 612, and/or memory 610 may include, be supplemented by, or incorporated in, one or more application-specific integrated circuits (ASICs) and/or one or more field programmable gate arrays (FPGAs).

Data storage device 612 and memory 610 each include a tangible non-transitory computer readable storage medium. Data storage device 612, and memory 610, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 608 may include peripherals, such as a printer, scanner, display screen, etc. For example, input/output devices 608 may include a display device such as a cathode ray tube (CRT) or liquid crystal display (LCD) monitor for displaying information to the user, a keyboard, and a pointing device such as a mouse or a trackball by which the user can provide input to computer 602.

An image acquisition device 614 can be connected to the computer 602 to input image data (e.g., medical images) to the computer 602. It is possible to implement the image acquisition device 614 and the computer 602 as one device. It is also possible that the image acquisition device 614 and the computer 602 communicate wirelessly through a network. In a possible embodiment, the computer 602 can be located remotely with respect to the image acquisition device 614.

Any or all of the systems and apparatus discussed herein may be implemented using one or more computers such as computer 602.

One skilled in the art will recognize that an implementation of an actual computer or computer system may have other structures and may contain other components as well, and that FIG. 6 is a high level representation of some of the components of such a computer for illustrative purposes.

Independent of the grammatical term usage, individuals with male, female or other gender identities are included within the term.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer-implemented method comprising:
receiving a pre-contrast medical image and a plurality of post-contrast medical images of an anatomical object of a patient;
generating a mask of the anatomical object based on at least one of 1) the pre-contrast medical image or 2) one or more of the plurality of post-contrast medical images;
generating processed post-contrast medical images each associated with a respective feature by:
identifying principal eigenvectors based on the plurality of post-contrast medical images masked by the mask of the anatomical object, and
reshaping each of the principal eigenvectors to generate a respective one of the processed post-contrast medical images, the processed post-contrast medical images comprising an image of an average of the plurality of post-contrast medical images and an image identifying a primary contribution of contrast enhanced material;
performing a medical imaging analysis task using a machine learning based network based on the processed post-contrast medical images and the pre-contrast medical image masked with the mask of the anatomical object; and
outputting results of the medical imaging analysis task.

2. The computer-implemented method of claim 1, wherein generating processed post-contrast medical images each associated with a respective feature comprises:
   performing a dimension reduction operation for extracting the processed post-contrast medical images from the plurality of post-contrast medical images.

3. The computer-implemented method of claim 2, wherein identifying principal eigenvectors based on the plurality of post-contrast medical images masked by the mask of the anatomical object comprises:
   identifying the principal eigenvectors based on a vectorized representation of the plurality of post-contrast medical images masked by the mask of the anatomical object.

4. The computer-implemented method of claim 1, wherein the features represent key components extracted from the plurality of post-contrast medical images masked by the mask of the anatomical object.

5. The computer-implemented method of claim 1, wherein the pre-contrast medical image and the plurality of post-contrast medical images are fat-saturated T1 weighted magnetic resonance imaging images of the patient.

6. The computer-implemented method of claim 1, where the machine learning based network receives as input 1) the pre-contrast medical image masked with the mask of the anatomical object and 2) the processed post-contrast medical images and generates as output the results of the medical imaging analysis task.

7. The computer-implemented method of claim 1, wherein the medical imaging analysis task comprises at least one of segmentation or detection of a lesion.

8. The computer-implemented method of claim 1, wherein the anatomical object comprises a breast of the patient.

9. An apparatus comprising:
   means for receiving a pre-contrast medical image and a plurality of post-contrast medical images of an anatomical object of a patient;
   means for generating a mask of the anatomical object based on at least one of 1) the pre-contrast medical image or 2) one or more of the plurality of post-contrast medical images;
   means for generating processed post-contrast medical images each associated with a respective feature by:
      identifying principal eigenvectors based on the plurality of post-contrast medical images masked by the mask of the anatomical object, and
      reshaping each of the principal eigenvectors to generate a respective one of the processed post-contrast medical images, the processed post-contrast medical images comprising an image of an average of the plurality of post-contrast medical images and an image identifying a primary contribution of contrast enhanced material;
   means for performing a medical imaging analysis task using a machine learning based network based on the processed post-contrast medical images and the pre-contrast medical image masked with the mask of the anatomical object; and
   means for outputting results of the medical imaging analysis task.

10. The apparatus of claim 9, wherein the means for generating processed post-contrast medical images each associated with a respective feature comprises:
   means for performing a dimension reduction operation for extracting the processed post-contrast medical images from the plurality of post-contrast medical images.

11. The apparatus of claim 10, wherein identifying principal eigenvectors based on the plurality of post-contrast medical images masked by the mask of the anatomical object comprises:
   means for identifying the principal eigenvectors based on a vectorized representation of the plurality of post-contrast medical images masked by the mask of the anatomical object.

12. The apparatus of claim 9, wherein the features represent key components extracted from the plurality of post-contrast medical images masked by the mask of the anatomical object.

13. The apparatus of claim 9, wherein the pre-contrast medical image and the plurality of post-contrast medical images are fat-saturated T1 weighted magnetic resonance imaging images of the patient.

14. The apparatus of claim 9, where the machine learning based network receives as input 1) the pre-contrast medical image masked with the mask of the anatomical object and 2) the one or more processed post-contrast medical images and generates as output the results of the medical imaging analysis task.

15. A non-transitory computer readable medium storing computer program instructions, the computer program instructions when executed by a processor cause the processor to perform operations comprising:
   receiving a pre-contrast medical image and a plurality of post-contrast medical images of an anatomical object of a patient;
   generating a mask of the anatomical object based on at least one of 1) the pre-contrast medical image or 2) one or more of the plurality of post-contrast medical images;
   generating processed post-contrast medical images each associated with a respective feature by:
      identifying principal eigenvectors based on the plurality of post-contrast medical images masked by the mask of the anatomical object, and
      reshaping each of the principal eigenvectors to generate a respective one of the processed post-contrast medical images, the processed post-contrast medical images comprising an image of an average of the plurality of post-contrast medical images and an image identifying a primary contribution of contrast enhanced material;
   performing a medical imaging analysis task using a machine learning based network based on the processed post-contrast medical images and the pre-contrast medical image masked with the mask of the anatomical object; and
   outputting results of the medical imaging analysis task.

16. The non-transitory computer readable medium of claim 15, wherein generating processed post-contrast medical images each associated with a respective feature comprises:
   performing a dimension reduction operation for extracting the processed post-contrast medical images from the plurality of post-contrast medical images.

17. The non-transitory computer readable medium of claim 16, wherein identifying principal eigenvectors based on the plurality of post-contrast medical images masked by the mask of the anatomical object comprises:
   identifying the principal eigenvectors based on a vectorized representation of the plurality of post-contrast medical images masked by the mask of the anatomical object.

18. The non-transitory computer readable medium of claim 15, wherein the features represent key components extracted from the plurality of post-contrast medical images masked by the mask of the anatomical object.

19. The non-transitory computer readable medium of claim 15, wherein the medical imaging analysis task comprises at least one of segmentation or detection of a lesion.

20. The non-transitory computer readable medium of claim 15, wherein the anatomical object comprises a breast of the patient.

* * * * *